Dec. 30, 1958 K. E. BRISTOL 2,866,717
PROCESS OF PREPARING A FILM CASTING SURFACE
Original Filed Aug. 13, 1952

INVENTOR.
KENNETH E. BRISTOL
BY
R. L. Miller
ATTORNEY

United States Patent Office 2,866,717
Patented Dec. 30, 1958

2,866,717

PROCESS OF PREPARING A FILM CASTING SURFACE

Kenneth E. Bristol, Akron, Ohio, assignor, by mesne assignments, to The Goodyear Tire & Rubber Company, a corporation of Ohio Original application August 13, 1952, Serial No. 304,179, now abandoned. Divided and this application January 14, 1955, Serial No. 481,899

5 Claims. (Cl. 117—10)

This invention relates to a non-blocking web or film and a method for preparing it. The invention includes the preparation of a film casting surface, as well as the film prepared by casting onto the surface.

The term "blocking," as universally used in the film conversion field, means the adherence of one film surface to another. This may be caused by a static charge on the film surface, by the surface condition of the film itself, by pressure, or by the film being slightly heat tackified.

Films which are used by the packaging industry are generally manufactured in sheet form and incorporated into rolls for use or sale. There are many converters of such film who manufacture packages and pouches for the preservation and display of many items. Blocking is an acute problem in the processing of such film and in the manufacture and storage of products made therefrom.

In the past it has been the practice to prevent blocking by (1) the use of paper slip sheets, (2) separation of the films by water, (3) separation by means of a viscous liquid, or (4) separation by finely divided solids. All of these methods have proven unsatisfactory in the merchandising of food products and other products where customer appeal is essential, freedom from contamination is necessary and transparency is required. In the preparation of rolls, a paper slip sheet is generally added to prevent adherence of the film strip as it is rolled onto itself. This procedure is costly and adds considerably to the time necessary to prepare packages from film rolls because it is necessary to remove the paper. The use of water creates a clouded film through the trapping of water droplets on the surface. When uncompounded viscous liquids are used to eliminate blocking, the film surface is made oily to the touch, whereas the use of finely divided solids leaves the film speckled.

It is an object of this invention to provide a non-blocking film. It is another object of this invention to provide a film casting surface containing microscopic pits. It is a further object of the invention to provide a non-locking film with microscopic bumps on at least one side. It is still another object of this invention to provide a method for preparing a film casting surface having microscopic pits thereon. It is a further object of this invention to provide a method for making a web or film having microscopic bumps thereon. Other objects and advantages of the invention will become apparent as the description proceeds.

In the practice of this invention, a novel casting surface is provided on a customary film casting base and film is cast thereon using the customary machinery. For example, the film casting base can be a cylindrical casting surface, or a flexible belt casting surface.

The casting base surface provided contains many microscopic pits on the surface thereof so that film which has been cast onto such a surface will solidify with microscopic bumps on the belt side thereof. These microscopic bumps provide slip for the film contacting surface but do not interfere in any way with the transparency or operability of the films.

In providing a film casting surface having microscopic pits, it is essential that a surface-forming material be used which is insoluble in the solvents normally used as carriers for the film-forming material when the film is cast. Benzene, methyl ethyl ketone and toluene are representative solvents from which film can be cast.

According to this invention, the resinous material used as the casting surface must be soluble in a volatile solvent and insoluble in another volatile liquid which can be dispersed in a solution of the resin but remain immiscible therewith and which is of lesser volatility than the solvent. This is necessary in order to obtain evaporation of the volatile non-solvent after at least partial solidification of the resin. In this manner microscopic pits are created in the facing of the film casting surface. One or more solvents for the casting surface material and one or more immiscible volatile materials can be used in the practice of the invention.

After preparation of the casting surface a film can be cast thereon which contains microscopic bumps corresponding to the pits in the casting surface. In this manner, a non-blocking film is provided.

The description of the invention can be facilitated by reference to the accompanying drawing which illustrates one form of apparatus embodying the teachings of the present invention.

Figure 1:
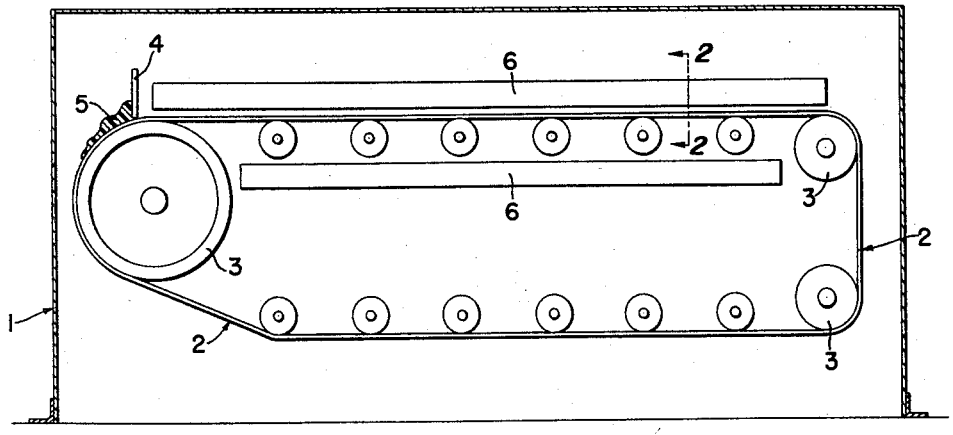
Figure 1 is a side elevation showing the preparation of a belt surface.
Figure 2:
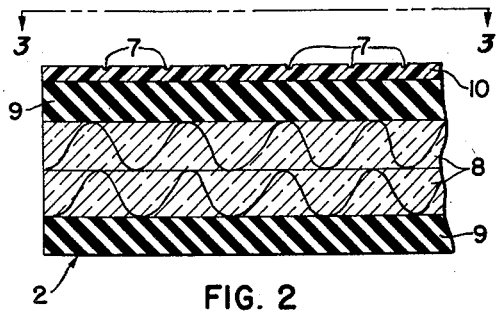
Figure 2 is an enlarged cross section of the finished belt surface taken along the lines 2—2 of Figure 1.
Figure 3:
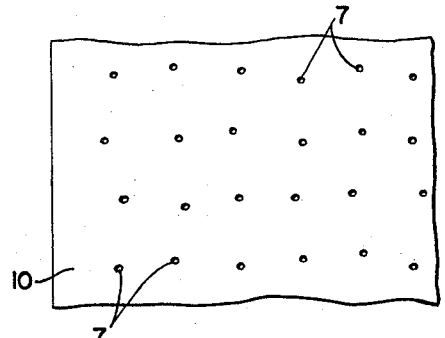
Figure 3 is an enlarged fragmentary plan view taken along the lines 3—3 of Figure 2.
Figure 5:
Figure 5 is an enlarged cross section of the cast film as seen from a transverse section of the film taken along the lines 5—5 of Figure 4.
Figure 4:
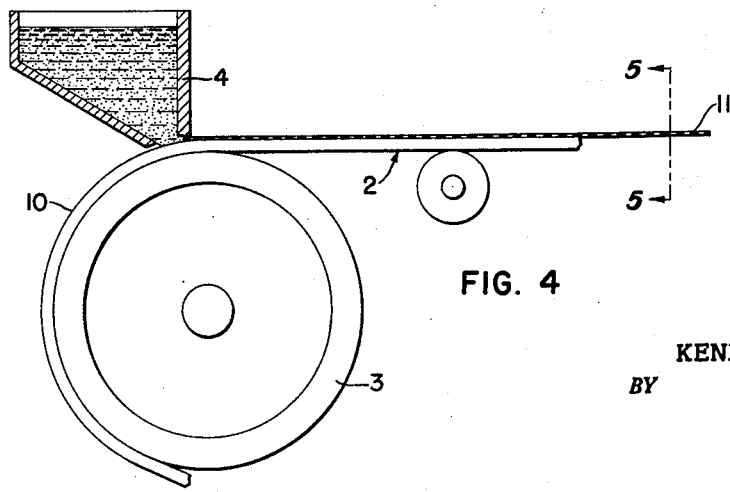
Figure 4 is a partial side elevation of a film-forming apparatus showing film-forming material being cast thereon.

In the practice of the invention, a conventional film-forming apparatus 1 having a belt 2 which rotates on rollers 3 and having a doctor blade 4 for adjusting the thickness of the coating composition 5 is employed.

The surface-forming composition is a material which is soluble in a solvent but which is insoluble in the film carrier. This is an essential requirement of the invention because any film carrier which would dissolve the resin used for making the film casting surface would destroy the surface. The material employed can be any heat stable material which meets these conditions.

The casting surface material employed can contain various modifiers which increase adhesion to the casting base or which impart any other desired characteristics. For example, when polyvinyl alcohol is used as the coating material, it can be modified with water soluble or aqueous acid soluble amino polymers which increase adhesion. Also, plasticizers such as urea-formaldehyde resins can be added which aid flexibility and assist in stripping the cast film from the casting surface.

In preparing the casting surface, any amount of solvent can be used which renders the casting surface material fluid, and the amount will vary with the composition and solvent used. Usually, in the practice of the invention the proportion of resin to solvent can range from 8 to 30 parts by weight of resin to 100 parts by weight of solvent.

Into this mixture can then be dispersed an immiscible liquid which has a temperature of volatilization higher than the resin solvent. Any liquid can be used in the practice of this invention if it is insoluble in the coating resin solvent and if it does not precipitate the resin from the resin solution.

The amount of immiscible liquid which is added to the resin-solvent solution can range from 25 to 100 parts by weight of immiscible liquid to 100 parts by weight of resin in the cement. In the usual practice of the invention, about 35–50 parts by weight of immiscible liquid to 100 parts by weigh of resin is preferred.

The number and size of the pits in the casting surface can be varied as desired by increasing or decreasing the amount of the immiscible volatile material and the degree of its dispersion. Also, the number and size of the pits can be varied by altering the drying conditions. For example, rapid accelerated drying would cause a more rapid volatilization of the immiscible material and this in turn would create larger pits due to the expansion of the gas as it traverses the surface layer.

In the practice of the invention, the prepared coating composition is spread evenly on the casting base, such as a belt surface, to a thickness of about 0.002 to 0.15 centimeter. Buildup of the casting surface is accomplished by rotating until the desired thickness is obtained. This may require from 1 to 50 passes through the apparatus, although 5 passes is usually sufficient. As each pass is made, the casting base rotates past a heating zone 6 which aids in rapid evaporation and formation of the flexible resinous casting surface. Heating can be generally accomplished by any conventional heating means. For example, hot water, steam, electric panels, or infrared radiation can be used. Although heating is usually employed, the casting surface can be air dried.

The solvent evaporates first leaving the resin deposited on the casting base. After partial solidification of the resin, the dispersed phase of the coating composition evaporates leaving microscopic pits 7 in the casting surface.

The casting base 2 can be constructed in any usual manner. A base that has worked very well comprises a fiber glass core 8 covered on each side by compounded rubber 9. The belt surface 10 can be applied to the upper rubber ply 9.

The invention is broadly applicable to a variety of film casting surface compositions which can be used to cast any of the customary film forming materials from solution. However it is critical that the solvent for the film casting composition be of such a nature that it does not attack the casting surface and that the added non-solvent volatile liquid evaporate at a temperature higher than the surface material solvent.

For example, a gelatinous or a resinous material such as water soluble ethyl or methyl cellulose, a polyvinyl alcohol, a water soluble derivative of polyvinyl alcohol, or gelatine can be used as the casting surface.

In the practice of the invention, one or more non-solvent volatile liquids can be added to the cement in order to provide the casting surface with microscopic pits. Insoluble esters, such as ethyl benzoate, which have a boiling point above 220° F. are useful in the practice of the invention. Also toluene, xylene and petroleum fractions having boiling points between 220° F. and 350° F. can be used.

The film casting surface can be used in conventional equipment to cast any of the conventional film-forming materials such as rubber hydrochloride, chlorinated rubber, polyethylene, polyvinyl chlorides, and cellulose derivatives.

In general, a desirable film casting surface according to the present invention provides microscopic bumps on the cast film in an amount ranging from about 100 to 2,000 per square centimeter. These bumps correspond substantially to a hemispherical shape and usually have radii ranging from about 1 to 10 microns.

In this manner, a film 11 is provided which can be rolled into rolls or cut into package blanks without the danger of blocking and without the use of costly and time consuming processes as practiced in the past.

The invention is conveniently described with reference to rubber hydrochloride film which can conveniently be cast onto a polyvinyl alcohol casting surface. The polyvinyl alcohol is usually dissolved in water or in a solution of water and a low boiling alcohol to form a spreadable cement. The solvent can vary from all water to 50 percent water and 50 percent alcohol. Such low boiling alcohols as methyl, isopropyl, ethyl, and butyl can be used, but ethyl alcohol is preferred for the generally accepted practical reasons. The range of resin to solvent is preferably from about 8 to 20 parts by weight of resin to 100 parts by weight of solvent. About 9 parts by weight of water-alcohol mixture to 1 part by weight of polyvinyl alcohol is particularly effective. When a polyvinyl alcohol is the resin and a mixture of water and alcohol is the solvent, xylene is the preferred immiscible liquid. Mixing of the cement and dispersion of the immiscible liquid can be accomplished in a conventional blender. About 45 parts by weight xylene can be added to 100 parts by weight of polyvinyl alcohol in cement form. When properly dispersed, this composition provides a good film casting surface material which, when dried, will provide sufficient microscopic pits in the casting surface to eliminate blocking of rubber hydrochloride film which is cast thereon.

The practice of the invention is further illustrated by the following examples.

Example 1

A film casting belt surface was prepared in the following manner. The casting surface formulation used was:

| | Grams |
|---|---|
| Polyvinyl alcohol | 50 |
| Polyglycerol | 20 |
| Ethyl alcohol | 75 |
| Water | 375 |
| Dioctyl sodium sulfosuccinate | 0.25 |
| Xylene | 17.5 |

The ethyl alcohol and polyglycerol were placed in a suitable container. The polyvinyl alcohol was then slowly stirred therein at room temperature. The mixture was next heated to a temperature of 160° F. to 180° F. and such heat was maintained for a brief period to effect swelling of the polyvinyl alcohol. When the mixture began to bubble, heating was stopped and water was added. The temperature of the water is immaterial because effecting solution of the polyvinyl alcohol is very easy and quite rapid. The solution was next filtered and cooled to room temperature. It was cooled in order to give a better dispersion of the xylene which was then added together with the dioctyl sodium sulfosuccinate to aid in dispersion of the xylene. The whole mixture was then rapidly agitated. This composition, having a temperature of 80° F. to 100° F., was then used as a cement to coat the surface of a glass plate. Five separate coatings were made, giving a final dried thickness of about 0.025 centimeter.

The coated plate was placed in an oven where the temperature was maintained at 140° F. to 160° F. The water-alcohol component of the cement evaporated leaving a tacky surface. Thereafter, the xylene vaporized and passed off through the surface layer, leaving microscopic pits. There were about 1000 pits per square centimeter, whose radii ranged from about 1 to 5 microns.

After drying for 2 hours, a film of rubber hydrochloride was cast thereon from a benzene solution. The base side of the film contained microscopic bumps corresponding to the indicated casting base surface depressions. Several such film sections were stacked and placed in storage. These film segments displayed no blocking even after being stored for 8 months.

*Example 2*

A ten gallon batch of film casting surface cement was prepared from the following formulation:

| | Parts by Wt. | 10 Gal. Batch Wt., Lbs. |
|---|---|---|
| Polyvinyl alcohol | 100.00 | 7.60 |
| Polyglycerol | 40.00 | 3.04 |
| Ethyl alcohol | 360.00 | 27.36 |
| Water | 540.00 | 41.04 |
| Dioctyl sodium sulfosuccinate | 0.43 | 0.03 |

As in Example 1, the above ingredients were mixed to form a solution. After filtering and cooling, 220 cubic centimeters of xylene were added per gallon of cement. The mixture was then stirred at high speed until the xylene was evenly dispersed in the cement.

This emulsion was used to coat a surface of a conventional film casting belt to a thickness of 0.025 centimeter by making 5 passes through the coating apparatus. The film casting surface thus prepared contained about 1000 microscopic pits per square centimeter, having radii of 1 to 5 microns.

Rubber hydrochloride film containing microscopic bumps corresponding to the microscopic pits in the film casting surface were then prepared by casting from a benzene solution. Rolls of this film do not show evidence of blocking after storage for eight months.

*Example 3*

A ten gallon batch of film casting surface cement was made from the following formulation:

| | Parts by Wt. | 10 Gal. Batch Wt., Lbs. |
|---|---|---|
| Polyvinyl alcohol | 100.00 | 7.60 |
| Polyglycerol | 40.00 | 3.04 |
| Ethyl alcohol | 360.00 | 27.36 |
| Water | 540.00 | 41.04 |
| Dioctyl sodium sulfosuccinate | 0.43 | 0.03 |

These chemicals were mixed together to form a solution according to the teachings of Example 1.

After filtering and cooling, 150 cubic centimeters of ethyl benzoate per gallon of cement were added. Rapid agitation was instituted to obtain dispersion of the ethyl benzoate. This composition was then used to make a film casting surface. The surface was prepared and a film cast thereon in the same manner as disclosed in Example 2.

The rolls of rubber hydrochloride film containing microscopic bumps so prepared were found to be non-blocking and transparent after extended storage.

This application is a division of co-pending application Serial No. 304,179, filed August 13, 1952, and now abandoned.

While certain representative embodiments and details have been shown for the purpose of illustrating the invention, it will be apparent to those skilled in this art that various changes and modifications may be made therein without departing from the spirit or scope of the invention.

I claim:

1. The process of preparing a film casting surface having microscopic pits in the exposed portion thereof which comprises the steps of (1) making a cement by dissolving a surface-forming material in a solvent, (2) preparing a dispersion by dispersing in said cement a volatile liquid which is immiscible with the cement and which has a higher temperature of vaporization than said solvent, (3) coating a film casting base with said dispersion and (4) heating at a temperature sufficient to evaporate the solvent in order to deposit the surface-forming material on the casting base, continuing the heating at a temperature sufficient to cause the dispersed droplets of immiscible liquid to rupture near the surface of the partially gelled surface-forming material and thereafter continuing the heating in order to coalesce the ruptured surface-forming material into a continuous surface having microscopic indentations therein and to tenaciously adhere the surface-forming material to the base.

2. The process of preparing a film casting surface having microscopic pits in the exposed portion thereof which comprises the steps of (1) making a cement by dissolving a gelatinous surface-forming material in a solvent, (2) preparing a dispersion by dispersing in said cement a volatile liquid which is immiscible with the cement and which has a higher temperature of vaporization than said solvent, (3) coating a film casting base with said dispersion and (4) heating at a temperature sufficient to evaporate the solvent in order to deposit the surface-forming material on the casting base, continuing the heating at a temperature sufficient to cause the dispersed droplets of immiscible liquid to rupture near the surface of the partially gelled surface-forming material and thereafter continuing the heating in order to coalesce the ruptured surface-forming material into a continuous surface having microscopic indentations therein and to tenaciously adhere the surface-forming material to the base.

3. The process of preparing a film casting surface having microscopic pits in the exposed portion thereof which comprises the steps of (1) preparing a coating composition of a material selected from the group consisting of methyl cellulose, ethyl cellulose, polyvinyl alcohol and gelatine dissolved in a solvent comprising a major portion of water and a minor portion of a low boiling alcohol, said cement having dispersed therein an immiscible liquid selected from the group consisting of toluene, xylene, ethylbenzoate, and petroleum hydrocarbons, (2) spreading said composition on a film casting base, and (3) heating at a temperature sufficient to evaporate the solvent in order to deposit the coating composition on the casting base, continuing the heating at a temperature sufficient to cause the dispersed droplets of immiscible liquid to rupture near the surface of the partially gelled coating composition and thereafter continuing the heating in order to coalesce the ruptured coating composition into a continuous surface having microscopic indentations therein and to tenaciously adhere the coating composition to the base.

4. The process of preparing a film casting surface having microscopic pits which comprises coating a casting base with a coating composition comprising polyvinyl alcohol dissolved in a solvent comprising a major portion of water and a minor portion of a low boiling alcohol, dispersing xylene into said composition, spreading said composition on said casting base and drying at a temperature sufficient to evaporate the solvent in order to deposit the polyvinyl alcohol on the casting base, continuing the heating at a temperature sufficient to cause the dispersed droplets of xylene to rupture near the surface of the partially gelled polyvinyl alcohol and thereafter continuing the heating in order to coalesce the ruptured polyvinyl alcohol into a continuous surface having microscopic indentations therein and to tenaciously adhere the polyvinyl alcohol to the base.

5. The process of preparing a film casting surface having from 100 to 2,000 microscopic pits per square centimeter whose radii range from 1 to 10 microns which comprises coating a casting base with a cement comprising polyvinyl alcohol dissolved in a solvent comprising a major portion of water and a minor portion of a low boiling alcohol, dispersing xylene into said cement, spreading said cement on said casting base and drying at a temperature sufficient to evaporate the solvent in order to deposit the polyvinyl alcohol on the casting base, continuing the heating at a temperature sufficient to cause the dispersed droplets of xylene to rupture near the surface of the partially gelled polyvinyl alcohol and thereafter continuing the heating in order to coalesce the ruptured polyvinyl alcohol into a continuous surface having microscopic indentations therein and to tenaciously adhere the polyvinyl alcohol to the base.

References Cited in the file of this patent

UNITED STATES PATENTS

| | | |
|---|---|---|
| 1,922,548 | Mattin | Aug. 15, 1933 |
| 2,198,621 | Izard | Apr. 30, 1940 |
| 2,317,447 | Domizi | Apr. 27, 1943 |
| 2,327,627 | Esselen | Aug. 24, 1943 |
| 2,682,517 | Asaff | June 27, 1954 |

FOREIGN PATENTS

| | | |
|---|---|---|
| 121,624 | Australia | July 11, 1946 |

UNITED STATES PATENT OFFICE

CERTIFICATE OF CORRECTION

Patent No. 2,866,717                                        December 30, 1958

Kenneth E. Bristol

It is hereby certified that error appears in the printed specification of the above numbered patent requiring correction and that the said Letters Patent should read as corrected below.

Column 1, line 54, for "non-locking" read -- non-blocking --.

Signed and sealed this 21st day of April 1959.

(SEAL)
Attest:

KARL H. AXLINE
Attesting Officer

ROBERT C. WATSON
Commissioner of Patents